United States Patent [19]
Ritzer

[11] Patent Number: 5,608,187
[45] Date of Patent: Mar. 4, 1997

[54] POST INSULATOR

[75] Inventor: Leopold Ritzer, Untersiggenthal, Switzerland

[73] Assignee: ABB Research Ltd., Zurich, Switzerland

[21] Appl. No.: 350,996

[22] Filed: Nov. 29, 1994

[30] Foreign Application Priority Data

Dec. 23, 1993 [DE] Germany ............... 43 44 043.6

[51] Int. Cl.⁶ .................................................. H01B 9/04
[52] U.S. Cl. ................. 174/25 G; 174/30; 174/138 R; 174/149 B
[58] Field of Search .................. 174/17 GF, 25 G, 174/26 G, 30, 99 B, 99 R, 149 B, 137 R; 200/148 R

[56] References Cited

U.S. PATENT DOCUMENTS

| | | | |
|---|---|---|---|
| 3,652,778 | 3/1972 | Sakai | 174/99 B X |
| 3,906,149 | 9/1975 | Hashoff et al. | 174/167 |
| 4,145,565 | 3/1979 | Donon | 174/28 |
| 4,415,762 | 11/1983 | Ponder | 174/99 B X |
| 4,688,142 | 8/1987 | Hjortsberg et al. | 174/99 B X |
| 4,786,761 | 11/1988 | Hama et al. | 174/22 C |
| 5,416,266 | 5/1995 | Muller | 174/21 C |

FOREIGN PATENT DOCUMENTS

| | | |
|---|---|---|
| 0288715B1 | 11/1988 | European Pat. Off. . |
| 1665131 | 3/1976 | Germany . |

*Primary Examiner*—Kristine L. Kincaid
*Assistant Examiner*—Paramita Ghosh
*Attorney, Agent, or Firm*—Burns, Doane, Swecker & Mathis, L.L.P.

[57] ABSTRACT

The post insulator (6) has an insulator body (8), of cured cast resin, which can be subjected to a pressure medium, and at least one potted fitting (11) penetrating the insulator body (8) and subjected to high voltage. The metallic support body (12) has a lateral surface (15). The intention is to obtain a post insulator which is of simple structure and which is designed for comparatively high mechanical loading. This is achieved by providing the lateral surface (15) of the support body (12) with a bonding layer (13) which adheres better to the lateral surface (15) than the cured cast resin. The cured cast resin is cross-linked with the bonding layer (13).

7 Claims, 1 Drawing Sheet

POST INSULATOR

BACKGROUND OF THE INVENTION

1. Field of the Invention

The invention is based on a post insulator.

2. Discussion of Background

An insulator having an insulator body is known from European Patent Specification 0,288,715 B1. The insulator body can be subjected to a pressure medium. Insulant gases such as, for example, $SF_6$ or else mineral oil may be envisaged as the pressure medium. In addition, the insulator could even be subjected to a vacuum. The insulator body consists of a cured cast resin. A potted fitting which contains a metallic support body passes through the insulator body. During operation, the potted fitting is subjected to high voltage. The support body has a lateral surface which is provided with a coupling layer which is applied in a manner which is leaktight with respect to the pressure medium and is designed to be elastic. The insulator body is encapsulated with this elastic coupling layer.

Elastically designed coupling layers of this type are well-suited for insulators with comparatively low mechanical loading. For more modern systems, in which the insulators are loaded to ever-increasing levels, elastic coupling layers of this kind are no longer suitable, since better adhesion between the lateral surface of the support body and the insulator body is demanded.

SUMMARY OF THE INVENTION

Accordingly, one object of the invention is to provide a novel post insulator which is of simple structure and which is designed for comparatively high mechanical loading.

The post insulator has an insulator body, of cured cast resin, which can be subjected to a pressure medium, and at least one potted fitting penetrating the insulator body and subjected to high voltage. The metallic support body has a lateral surface. The lateral surface of the support body is provided with a bonding layer which adheres better to the lateral surface than the cured cast resin. The cured cast resin is cross-linked with the bonding layer.

If an epoxy resin is used as the cured cast resin and if an adhesive based on epoxy resin is applied to the lateral surface as the bonding layer, then a particularly strong connection between the insulator body and the potted fitting is achieved. If a single-component adhesive is used as the adhesive, then particularly simple processing results. The single-component adhesive ARALDITE AV 119 from CIBA-GEIGY (ARALDITE is a registered trademark of CIBA-GEIGY) can be processed particularly simply, since it is thixotropic and also adheres very well to the lateral surface when it is cured before potting the potted fitting.

The further embodiments of the invention are the subject-matter of the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only those elements necessary for direct understanding of the invention have been represented.

DESCRIPTION OF THE PREFERRED EMBODIMENTS

Figure 1:
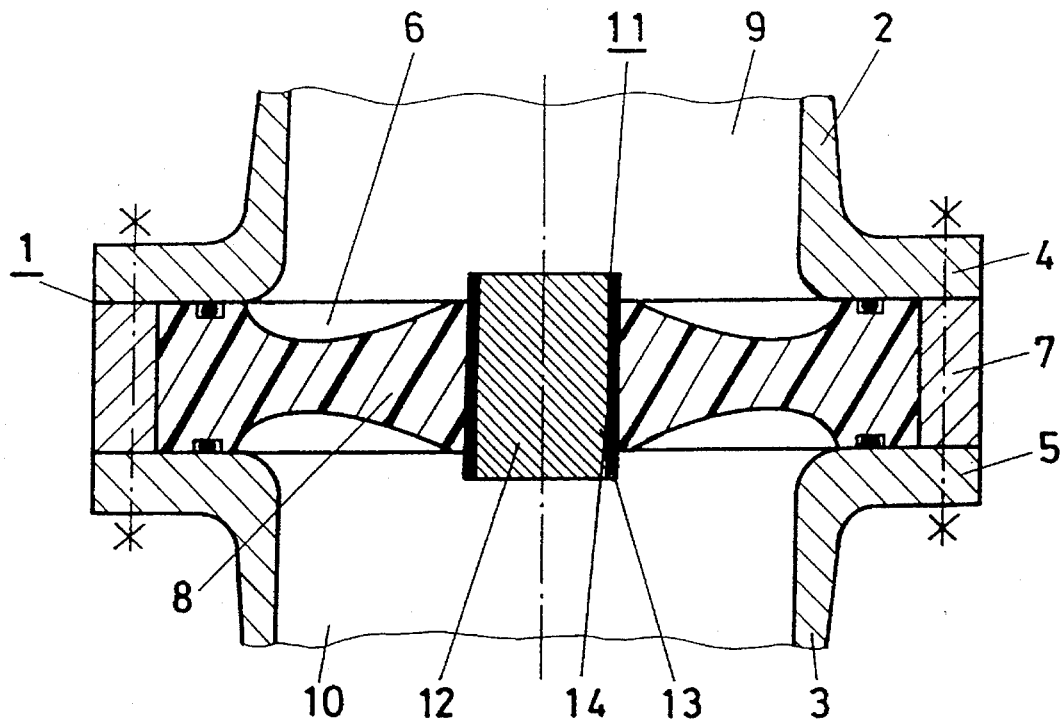
FIG. 1 shows a first diagrammatically represented embodiment of a post insulator.
Figure 2:
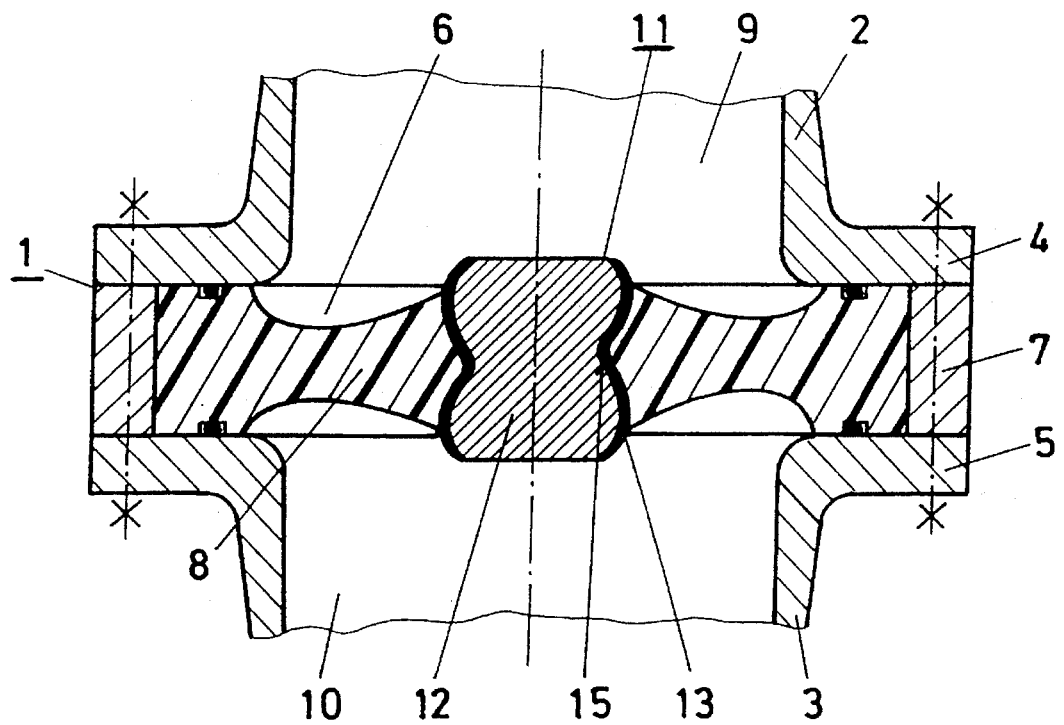
FIG. 2 shows a second diagrammatically represented embodiment of a post insulator.

Referring now to the drawings, wherein like reference numerals designate identical or corresponding parts throughout the several views, in FIG. 1 and FIG. 2 1 designates a housing formed by two tubular metallic enclosure parts 2, 3 and filled with an insulant. Pressurized insulant gases such as, for example, $SF_6$ or else mineral oil, or even a vacuum, may be envisaged as the insulant. Between annular flanges 4, 5, a disk-shaped post insulator 6 is clamped with a metallic annular fitting 7 forming its outer rim. Clamping is produced here by means of screwing. The post insulator 6 has an insulator body 8 made of a cast resin, designed in a disk shape. The post insulator 6 separates two pressure spaces 9, 10 of the housing 1 from one another in a pressure-tight manner. The insulator body 8 may have another form instead of the disk shape. The insulator body 8 carries at least one potted fitting 11 which penetrates the insulator body 8 and is intended for carrying current. During operation, the potted fitting 11 is subjected to high voltage. The potted fitting 11 consists of a support body 12 which is designed essentially cylindrically and of a bonding layer 13 applied thinly to its lateral surface 14, 15. The support body 12 is made of electrically conducting material, for example aluminum or copper or bronze or brass or steel. In the embodiment according to FIG. 1, the lateral surface 14 is designed as a smooth cylindrical surface. In the embodiment according to FIG. 2, the lateral surface 15 is designed as a corrugated surface which can absorb axially acting forces.

In the production of the insulator, the lateral surfaces 14, 15 are sandblasted immediately before application of the bonding layer 13, in order to achieve good binding of the bonding layer 13 to the support body 12. After the sandblasting, the roughened lateral surfaces 14, 15 are chemically degreased using a grease solvent such as acetone or trichloroethylene. A single-component adhesive ARALDITE AV 119 is used here for the bonding layer 13. The reference ARALDITE AV 119 is a registered trademark of CIBA-GEIGY, Basle. The single-component adhesive ARALDITE AV 119 is a formulated epoxy-resin adhesive based on bisphenol A.

The single-component adhesive ARALDITE AV 119 is applied in a layer thickness of from 0.05 to 1 mm to the degreased lateral surface 14, 15 and is cured for one hour at 120° C. Only then is the potted fitting 11 introduced into a casting mold and potted using the insulator body 8. The insulator body 8 shrinks on cooling and presses on the bonding layer 13, binding intimately to it.

The bonding layer 13 substantially improves the strength of the binding between the insulator body 8 and the support body 12. The bonding layer 13 is not elastic and does not yield to the bending moments acting on the insulator body 8. The adhesion is so strong that detachment between the potted fitting 11 and the insulator body 8 does not occur despite the bending moments acting on the bonding layer 13. The cast resins used for the insulator body 8 are designed so that the mechanical stresses occurring during shrinkage cannot lead to formation of cracks.

The post insulator 6 is loaded by reaction forces which are transmitted from the housing 1 or from the potted fitting 11 onto the insulator body 8, or by forces resulting from a pressure difference between the two pressure spaces 9 and 10. By virtue of the bonding layer 13, the cohesion between the support body 12 and the insulator body 8 is improved so that no detachment phenomena can occur with the maximum forces envisaged.

It is possible for the transition between the support body 12 and the insulator body 8 to be loaded dielectrically in a nonuniform manner, since either conducting points on the support body 12 or air inclusions in the insulator body 8 can lead to field distortions. In order to balance field distortions of this kind, it may be expedient to dope the single-component adhesive with a conducting or semiconducting powder, in order thus to make the bonding layer 13 into an equipotential surface, with the aid of which it is possible to control the field in this region. In this way, occurrence of partial discharges in this highly mechanically loaded region can be reliably prevented, which partial discharges can impair the mechanical strength of the cast resin or of the single-component adhesive. In this way, a post insulator 6 which can be highly mechanically loaded and has particularly good dielectric fatigue strength results.

If the cast resin is cast directly around the sandblasted and degreased support body 12, a tensile strength of the binding site of from $\sigma_z=8$ MPa to a maximum of 12 MPa results. In the case of the post insulator according to the invention, however, the tensile strength is substantially increased and a value of $\sigma_z =22$ MPa to 29 MPa results.

Obviously, numerous modifications and variations of the present invention are possible in light of the above teachings. It is therefore to be understood that within the scope of the appended claims, the invention may be practiced otherwise than as specifically described herein.

I claim:
1. A post insulator comprising:

an insulator body formed of cured cast resin;

at least one potted fitting, the potted fitting penetrating the insulator body;

the potted fitting having a metallic support body having a lateral surface; wherein the lateral surface has an unreinforced bonding layer thereon, the bonding layer adhering better to the lateral surface than the cured cast resin, and the cured cast resin is cross-linked with the bonding layer.

2. The post insulator as claimed in claim 1, wherein the cured cast resin includes an epoxy resin, and the bonding layer includes an adhesive based on epoxy resin which is applied to the lateral surface.

3. The post insulator as claimed in claim 2, wherein the adhesive includes a single-component adhesive.

4. The post insulator as claimed in claim 3, wherein the single-component adhesive is ARALDITE AV 119.

5. The post insulator as claimed in claim 2, wherein the adhesive based on epoxy resin is doped with one of a conducting and semiconducting powder.

6. The post insulator as claimed in claim 1, wherein the bonding layer has a thickness of 0.05 mm to 0.1 mm.

7. The post insulator as claimed in claim 1, wherein the cured cast resin is cross-linked with the bonding layer continuously around the lateral surface of the support body.

\* \* \* \* \*